United States Patent
Uchijima et al.

(10) Patent No.: US 10,024,026 B2
(45) Date of Patent: Jul. 17, 2018

(54) FRONT LOADER FRAME, FRONT LOADER EQUIPPED WITH FRONT LOADER FRAME, AND WORK VEHICLE EQUIPPED WITH FRONT LOADER

(71) Applicant: KUBOTA CORPORATION, Osaka (JP)

(72) Inventors: Akiyoshi Uchijima, Osaka (JP); Motonari Inaoka, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 231 days.

(21) Appl. No.: 14/809,627

(22) Filed: Jul. 27, 2015

(65) Prior Publication Data
US 2016/0032555 A1 Feb. 4, 2016

(30) Foreign Application Priority Data

Jul. 30, 2014 (JP) ................................ 2014-155390
May 14, 2015 (JP) ................................ 2015-098990

(51) Int. Cl.
| | |
|---|---|
| E02F 3/627 | (2006.01) |
| E02F 3/36 | (2006.01) |
| A01B 59/06 | (2006.01) |
| E02F 3/34 | (2006.01) |

(52) U.S. Cl.
CPC .......... *E02F 3/3695* (2013.01); *A01B 59/064* (2013.01); *E02F 3/34* (2013.01); *E02F 3/627* (2013.01)

(58) Field of Classification Search
CPC ... A01B 59/062; A01B 59/064; E02F 3/3695; E02F 3/627; E02F 3/6273; E02F 9/006; E02F 9/0808

USPC .......................................... 172/273; 414/686
See application file for complete search history.

(56) References Cited

U.S. PATENT DOCUMENTS

| | | | |
|---|---|---|---|
| 4,802,814 A | | 2/1989 | Kourogi |
| 5,248,237 A | | 9/1993 | Nakamura |
| 6,142,724 A | * | 11/2000 | Hirooka ............... E02F 3/6273 |
| | | | 414/686 |
| 2016/0333545 A1 | | 11/2016 | Ozeki |

FOREIGN PATENT DOCUMENTS

| | | |
|---|---|---|
| JP | 58-44130 | 3/1983 |
| JP | 5844130 | 3/1983 |
| JP | 2003-328832 | 11/2003 |
| JP | 2005-47372 | 2/2005 |
| WO | 2014/056904 | 4/2014 |

OTHER PUBLICATIONS

EP Search Report issued in EP 15178684 and dated Feb. 10, 2016 (3 pages).
JP Search Report and Office Action (with English translations) issued in JP 2015-098990 dated Apr. 11, 2018 (15 pages).

* cited by examiner

*Primary Examiner* — Anna M Momper
*Assistant Examiner* — Brendan P Tighe
(74) *Attorney, Agent, or Firm* — Greenblum & Bernstein, P.L.C.

(57) ABSTRACT

A front loader frame includes a first attachment having a first attachment surface that can be oriented on a first virtual plane and is fixable to one portion a vehicle body. A second attachment has a second attachment surface that can be oriented on a different virtual plane from the first virtual plane and is fixable to another portion of the vehicle body.

17 Claims, 15 Drawing Sheets

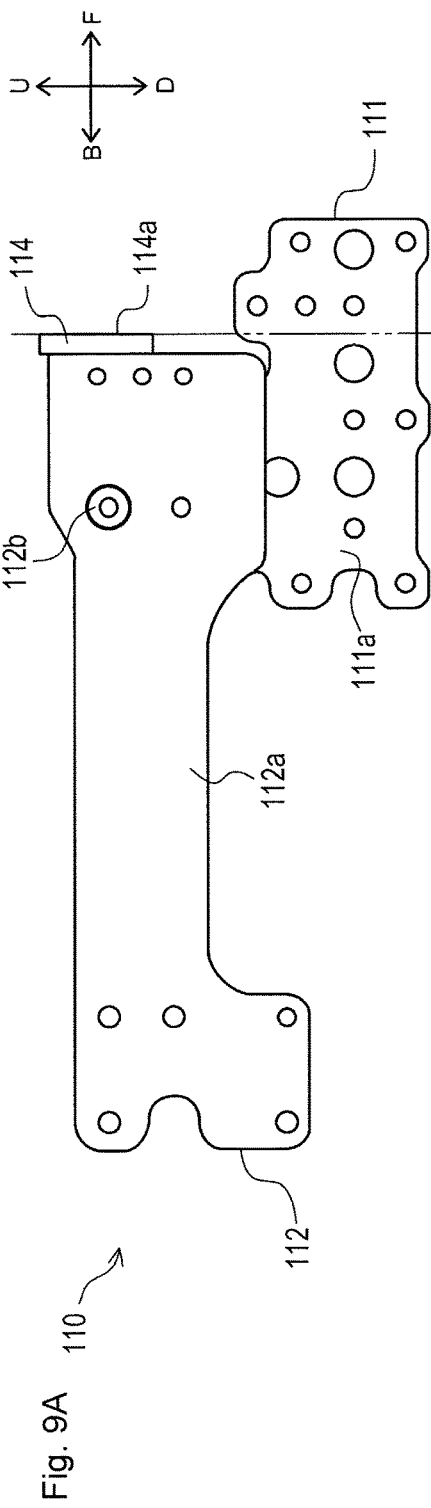
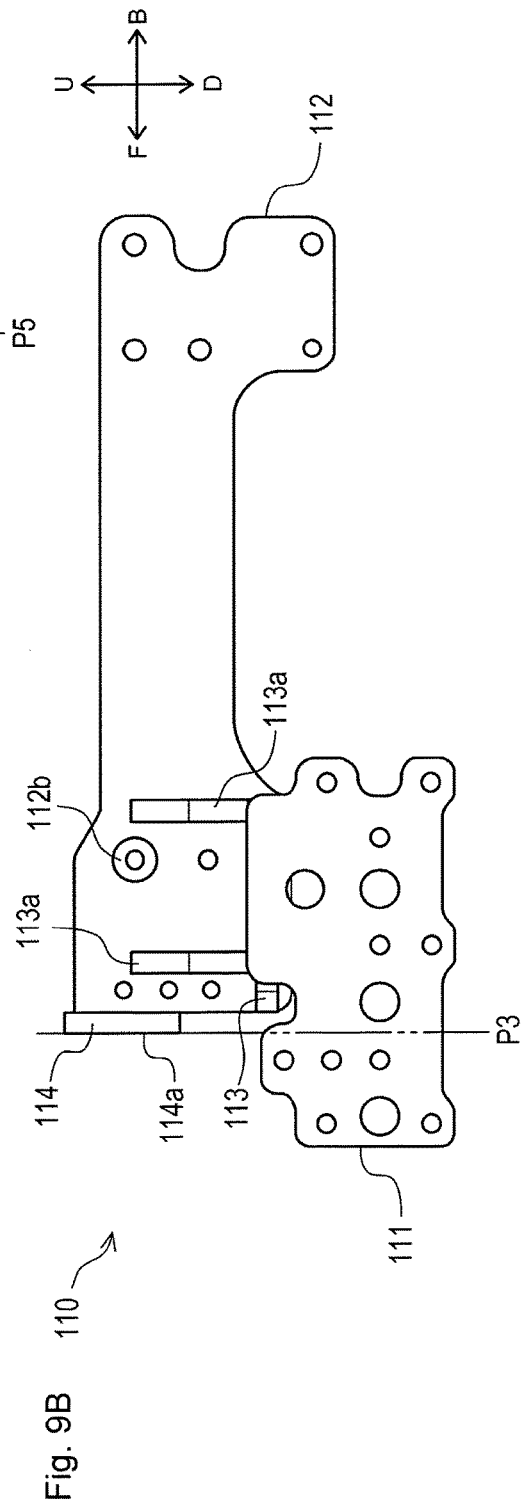
Fig. 9A
Fig. 9B

Fig. 13
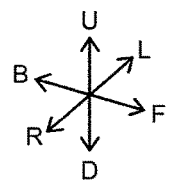
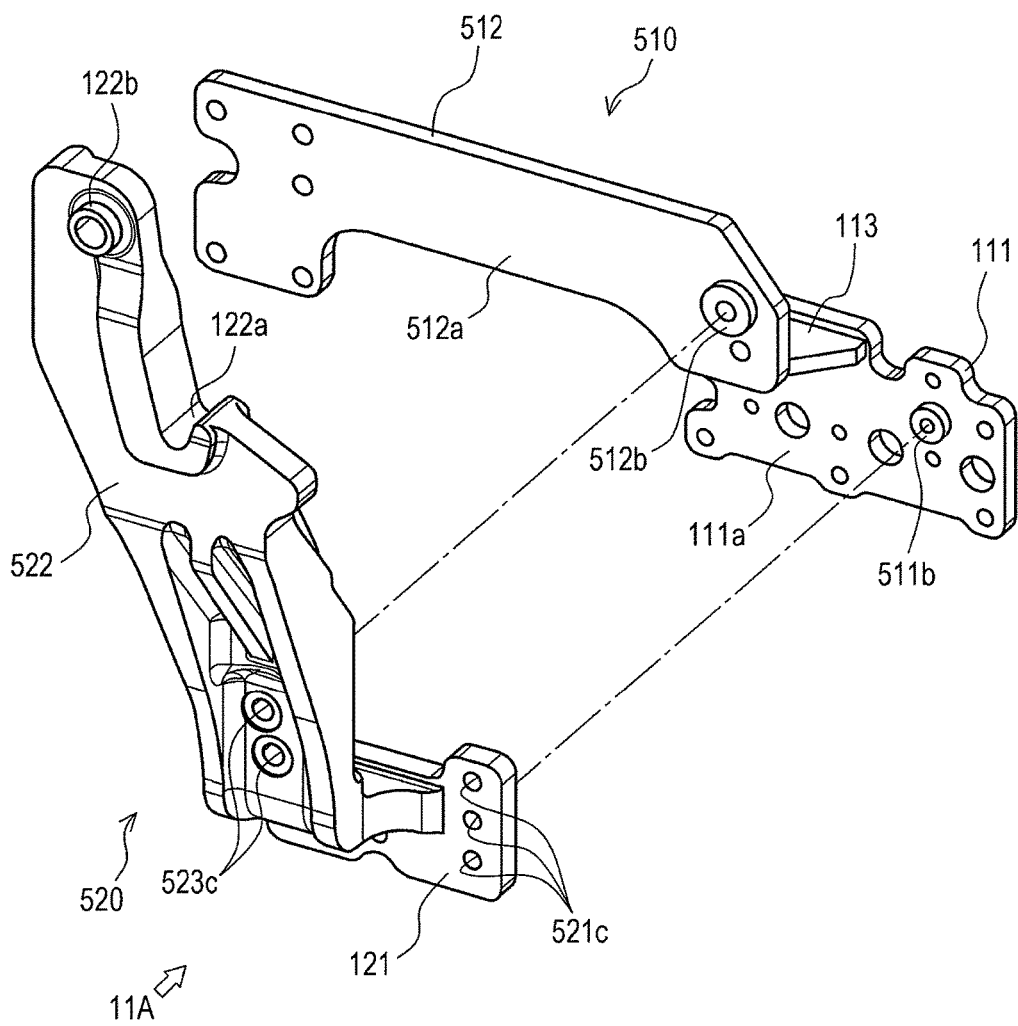

FRONT LOADER FRAME, FRONT LOADER EQUIPPED WITH FRONT LOADER FRAME, AND WORK VEHICLE EQUIPPED WITH FRONT LOADER

CROSS-REFERENCE TO RELATED APPLICATIONS

The present application claims priority under 35 U.S.C. § 119 of Japanese Application No. 2014-155390, filed on Jul. 30, 2014, and Japanese Application No. 2015-098990, filed on May 14, 2015, the disclosure of which is expressly incorporated by reference herein in its entirety.

BACKGROUND OF THE INVENTION

1. Field of the Invention

The present invention is related to technology of a front loader frame, a front loader equipped with the front loader frame, and a work vehicle equipped with the front loader.

2. Description of Related Art

Conventionally, technology of a front loader mounted on a work vehicle such as a tractor is well known. For example, Japanese Patent Laid-open Publication No. 2005-47372 discloses such technology.

In the technology disclosed in Japanese Patent Laid-open Publication No. 2005-47372, a mast support is formed so as to extend outward to both right and left from a body frame. A flat plate-like mast coupling piece is provided at an outer end portion of the mast support. An internal surface of a mast is fixed to an outer surface of the mast coupling piece in an abutting state. On an upper end portion of the mast, a boom coupled to a bucket is rotationally supported. Accordingly, in the technology disclosed in Japanese Patent Laid-open Publication No. 2005-47372, the mast and the mast support are coupled via a left-right pair of the flat surfaces (the mast coupling piece).

However, in the technology disclosed in Japanese Patent Laid-open Publication No. 2005-47372, one surface (abutting surface), where the mast and the mast coupling piece abut each other, receives a load applied to the mast. Therefore, in a case where a sufficient area for the abutting surface is not secured, there is insufficient strength, which is disadvantageous.

SUMMARY OF THE INVENTION

In view of the above-noted circumstances, the present invention provides a front loader frame capable of enhancing strength, a front loader equipped with the front loader frame, and a work vehicle equipped with the front loader.

Hereafter, non-limiting aspects of the present invention are described.

Specifically, according to one aspect of the present invention, the front loader frame includes: a first attachment having a first attachment surface that is arranged on a first virtual plane and is fixed to a vehicle body; a second attachment having a second attachment surface that is arranged on a second virtual plane that is different from the first virtual plane and is fixed to the vehicle body; and a support which supports a boom.

According to another aspect of the present invention, the second attachment surface is formed at a position displaced in an up-down direction with respect to the first attachment surface.

According to another aspect of the present invention, the front loader frame further includes an engagement portion that is formed in a recessed shape and is capable of engaging with the vehicle body.

According to another aspect of the present invention, the engagement portion is formed on each of the first attachment surface and the second attachment surface.

According to another aspect of the present invention, a front loader is equipped with the front loader frame.

According to another aspect of the present invention, a work vehicle is equipped with the front loader.

Non-limiting advantages of the present invention are as follows.

According to one aspect of the present invention, strength can be enhanced by receiving a load on the surfaces arranged on the different virtual planes (in other words, the first attachment surface and the second attachment surface).

According to another aspect of the present invention, strength can be enhanced by receiving the load on the surfaces formed at positions respectively displaced in the up-down direction (in other words, the first attachment surface and the second attachment surface).

According to another aspect of the present invention, strength can be enhanced by receiving the load on the engagement portion.

According to another aspect of the present invention, strength can be effectively enhanced by forming the engagement portion on the first attachment surface and the second attachment surface.

According to another aspect of the present invention, strength can be enhanced by receiving the load on the first attachment surface and the second attachment surface.

According to another aspect of the present invention, strength can be enhanced by receiving the load on the first attachment surface and the second attachment surface.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein:

FIG. 9A is a right side view of a first frame;

FIG. 9B is a left side view of the first frame;

FIG. 13 is a forward exploded perspective view of a main frame according to a fifth embodiment;

DETAILED DESCRIPTION OF THE INVENTION

Figure 1:
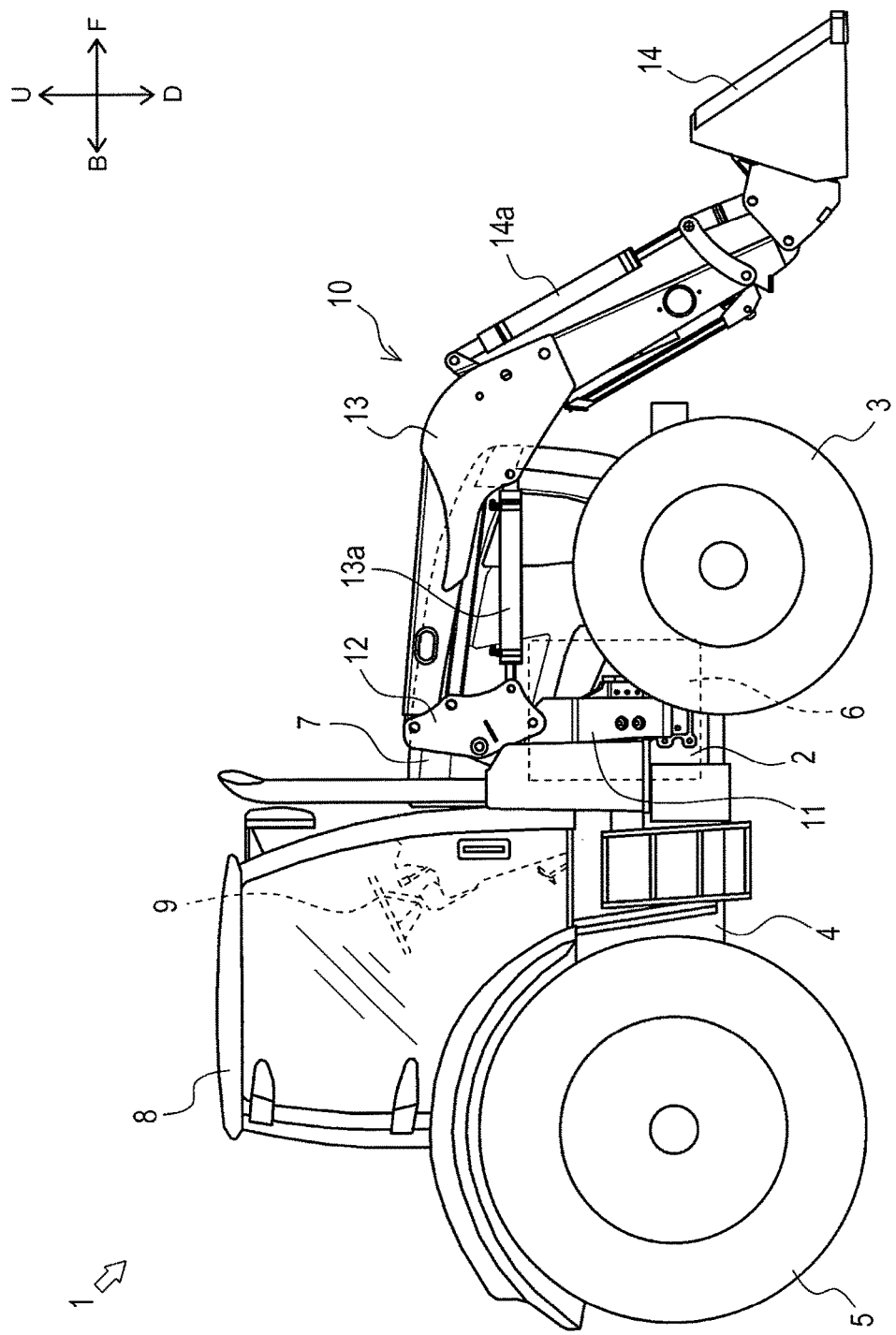
FIG. 1 is a lateral view of a tractor equipped with a front loader according to a first embodiment of the present invention.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the forms of the present invention may be embodied in practice.

In the following, directions indicated in the drawings by arrows U, D, F, B, L, and R are defined in the description as an upward direction, a downward direction, a forward (front) direction, a rearward (back) direction, a left direction, and a right direction, respectively.

First, an overall configuration of a vehicle body 1 of a tractor equipped with a front loader 10 according to a first embodiment of the present invention is described using FIG. 1.

The tractor includes primarily a body frame 2, front wheels 3, a transmission case 4, rear wheels 5, an engine 6, a hood 7, a cabin 8, a steering wheel 9, and the front loader 10.

The body frame 2 extends to a front portion of the vehicle body 1 such that a longitudinal direction of the body frame 2 is oriented in a front-back direction. A front portion of the body frame 2 is supported by a left-right pair of front wheels 3 via a front axle mechanism (not shown in the drawings). The transmission case 4 is fixated to a rear portion of the body frame 2. A rear portion of the transmission case 4 is supported by a left-right pair of rear wheels 5 via a rear axle mechanism (not shown in the drawings). The engine 6 is provided at a front-back direction middle portion of the body frame 2. The engine 6 is covered by the hood 7.

Power from the engine 6 is changed by a speed change apparatus (not shown in the drawings) housed in the transmission case 4, and then can be transmitted to the front wheels 3 via the front axle mechanism and can also be transmitted to the rear wheels 5 via the rear axle mechanism. The front wheels 3 and the rear wheels 5 are rotationally driven by the power from the engine 6 enabling the tractor to travel.

The cabin 8 is located behind the engine 6. An occupancy space, which a driver gets into, is formed in an interior of the cabin 8. In the occupancy space, there is arranged the steering wheel 9 which adjusts a turning angle of the front wheels 3, various operation tools (not shown in the drawings), a driver's seat (not shown) where the driver sits, and the like.

The front loader 10 is mounted to the front portion of the vehicle body 1. The front loader 10 includes primarily a left-right pair of main frames 11, a left-right pair of coupling frames 12, a left-right pair of booms 13, and a bucket 14.

The main frames 11 are fixed to both the left and right of the front portion of the vehicle body 1. The booms 13 are rotationally or pivotally supported on an upper portion of the left-right main frames 11, respectively, via the coupling frames 12. The booms 13 are arranged so as to extend forward and downward from the upper portion of the main frames 11. The bucket 14 is rotationally or pivotally coupled to a front end portion of the booms 13. The booms 13 can rotate or pivot with respect to the coupling frames 12 by extending/contracting a boom cylinder 13a. The bucket 14 can rotate or pivot with respect to the booms 13 by extending/contracting a bucket cylinder 14a. In this way, it is possible to perform excavation and transportation of soil/sand, for example, by appropriately rotating the booms 13 and the bucket 14.

Next, a detailed configuration of the main frames 11 is explained below using FIGS. 2 through 10. Moreover, the configurations of the left and right main frames 11 are substantially identical; therefore, only the main frame 11 arranged on the right side of the vehicle body 1 is described below, and the description of the main frame 11 arranged on the left side is omitted.

The main frame 11 supports the boom 13 via the coupling frame 12. The main frame 11 includes primarily a first frame 110 and a second frame 120. The main frame 11 is formed by assembling the first frame 110 and the second frame 120.

The first frame 110 shown in FIGS. 2 through 9 is configured to be fixed to the vehicle body 1. The first frame 110 includes primarily a first support part 111, a second support part 112, a coupling part 113 and a third support part 114.

The first support part 111 is formed in a plate shape. The first support part 111 is arranged vertically with respect to the left-right direction. The first support part 111 is formed in substantially a rectangular shape in a side view, with the longitudinal direction of the first support part 111 oriented in the front-back direction. A right side surface 111a of the first support part 111 is arranged on a first virtual plane P1 that is vertical to the left-right direction (see FIGS. 7 and 8).

The second support part 112 is formed in a plate shape. The second support part 112 is arranged vertically with respect to the left-right direction. The second support part 112 is formed in substantially a rectangular shape in a side view, with the longitudinal direction of the second support part 112 oriented in the front-back direction. The second support part 112 is formed at a front-back direction middle portion of the first support part 111 so as to extend behind the first support part 111 in the front-back direction. The second support part 112 is arranged displaced upward and rightward with respect to the first support part 111. Specifically, the second support part 112 is arranged at a right upper area of the first support part 111 in a front view (or a rear view). The second support part 112 is arranged with a front bottom part thereof overlapping a rear upper portion of the first support part 111 in a side view. A right side surface 112a of the second support part 112 is arranged on a second virtual plane P2 that is vertical to the left-right direction (see FIGS. 7 and 8).

The second virtual plane P2 is a plane surface parallel to the first virtual plane P1. The second virtual plane P2 is positioned on the right of the first virtual plane P1.

A pin 112b is provided on the second support part 112. The pin 112b is substantially a cylindrically shaped member with an axis direction facing the left-right direction. A left end portion of the pin 112b is fitted into and fixed to a through hole formed so as to run through a front upper portion of the second support part 112 in the left-right direction. In this way, the pin 112b is provided so as to project (and being circular in shape) toward the right from the right side surface 112a of the second support part 112.

The coupling part 113 couples the first support part 111 and the second support part 112. The coupling part 113 is formed of plate shaped members. The coupling part 113 is arranged vertically with respect to the up-down direction. The coupling part 113 is formed in substantially a rectangular shape in a plan view, with the longitudinal direction of the coupling part 113 oriented in the front-back direction. A left end of the coupling part 113 is fixed to a rear upper portion of the first support part 111. A right end of the coupling part 113 is fixed to a front bottom portion of the second support part 112. Reinforcing plates 113a form part of the coupling part 113.

The reinforcing plates 113a are provided as a front-back pair. The reinforcing plates 113a are formed in a plate shape. The reinforcing plates 113a are arranged vertically with respect to the up-down direction. The reinforcing plates 113a are formed in substantially an "L" shape in a front view. The reinforcing plates 113a are fixed to a front upper portion and rear end, respectively, of a coupling plate part of the coupling part 113. Left ends of the reinforcing plates 113a are fixed to the first support part 111. Right ends of the reinforcing plates 113a are fixed to the second support part 112. The first support part 111 and the second support part 112 are fixed more firmly as a result of the reinforcing plates 113a.

The third support part 114 is formed in a plate shape. The third support part 114 is arranged vertically with respect to the front-back direction. The third support part 114 is formed in substantially a rectangular shape in a front view, with the longitudinal direction of the third support part 114 oriented in the up-down direction. The third support part 114 is fixed to a front upper end of the second support part 112. A front side surface 114a of the third support part 114 is arranged on a fifth virtual plane P5 that is vertical to the front-back direction (see FIGS. 9A and 9B).

The fifth virtual plane P5 is a plane surface intersecting vertically with and perpendicular to the first virtual plane P1 and the second virtual plane P2.

As shown in FIGS. 2 through 8 and FIG. 10, the second frame 120 couples to the boom 13 via the coupling frame 12. The second frame 120 includes primarily a first attachment 121, a mast 122, a second attachment 123, a coupling part 124, and a third attachment 125.

The first attachment 121 is formed in a plate shape. The first attachment 121 is arranged vertically with respect to the left-right direction. The first attachment 121 is formed in substantially a rectangular shape in a side view, with the longitudinal direction of the first attachment 121 oriented in the front-back direction. A left side surface 121a of the first attachment 121 is arranged so as to face the right side surface 111a of the first support part 111. The left side surface 121a of the first attachment 121 is arranged on a third virtual plane P3 that is vertical to the left-right direction (see FIGS. 7 and 8).

A plurality of through holes 121b are formed on the first attachment 121. There are five through holes 121b formed at an appropriate distance from one another on the first attachment 121.

The mast 122 is formed in a bent plate shape. A lower end of the mast 122 is fixed to a right side surface of the first attachment 121. An upper portion of the mast 122 is formed so as to extend to an upper right area from the first attachment 121. An area at a top end portion of the mast 122 is formed vertically with respect to the left-right direction. In this way, the mast 122 is formed so as to extend in the up-down direction in a side view. A supporting groove 122a and a boss 122b are formed on the mast 122.

The supporting groove 122a is formed at an upper portion of the mast 122. The supporting groove 122a is formed in a shape opening upwardly ("U" shape in a side view).

The boss 122b is formed at the upper portion of the mast 122 (rear upper side of the supporting groove 122a). The boss 122b is formed in substantially a cylindrical shape having an axis line or center axis oriented in the left-right direction.

The second attachment 123 is formed in a bent plate shape. In a front view (or a rear view), the second attachment 123 is arranged at an upper right side of the first attachment 121 and at the left of an up-down direction middle part of the mast 122. An area at a bottom end portion of the second attachment 123 is formed vertically with respect to the left-right direction. An upper portion of the second attachment 123 is formed so as to extend to an upper right from the area at the bottom end portion of the second attachment 123. An area at an upper end portion of the second attachment 123 is formed vertically with respect to the left-right direction. A left side surface 123a of the area at the bottom end portion of the second attachment 123 is arranged so as to face a front portion of the right side surface 112a of the second support part 112. The left side surface 123a of the second attachment 123 is arranged on a fourth virtual plane P4 that is vertical to the left-right direction (see FIGS. 7 and 8). An engagement hole 123b is formed on the second attachment 123.

The engagement hole 123b is formed so as to run through, in the left-right direction, the area at the bottom end portion of the second attachment 123. An internal diameter of the engagement hole 123b is formed so as to be substantially identical to or slightly larger than an external diameter of the pin 112b provided on the second support part 112. The engagement hole 123b is formed at a position facing the pin 112b provided on the second support part 112. Thus, the engagement hole 123b is formed in a shape where a part of the left side surface 123a of the second attachment 123 is sunken (recessed shape). Further, a right end of the engagement hole 123b is blocked by a plate-like member (not shown in the drawings).

A plurality of through holes 123c are formed on the second attachment 123. There are five through holes 123c formed at an appropriate distance from one another on the second attachment 123. Further, the through holes 123c are also formed on the plate-like member which blocks the engagement hole 123b.

The fourth virtual plane P4 is a plane surface parallel to the third virtual plane P3. The fourth virtual plane P4 is positioned to the right of the third virtual plane P3. Further, a distance between the third virtual plane P3 and the fourth virtual plane P4 in the left-right direction is formed so as to be substantially identical to a distance between the first virtual plane P1 and the second virtual plane P2 in the left-right direction.

The coupling part 124 couples the second attachment 123 and the mast 122. The coupling part 124 is provided as a front-back pair of members. The parts or members coupling part 124 are formed in a plate shape. The coupling part 124 is arranged vertically with respect to the front-back direction. A left end of the coupling part 124 is fixed to a right side surface of the second attachment 123. A right end of the coupling part 124 is fixed to a left side surface of the mast 122.

The third attachment 125 is formed in a plate shape. The third attachment 125 is arranged vertically with respect to the front-back direction. The third attachment 125 is formed in substantially a rectangular shape in a front view. The third attachment 125 is fixed to a front upper end of the area at the bottom end portion of the second attachment 123. A left end portion of the third attachment 125 is positioned so as to project further to the left than a left side surface 123a of the second attachment 123. When frames 110 and 120 are coupled together, a rear side surface 125a of the third attachment 125 is located in substantially the same position, in the front-back direction, as a front side surface 114a of the third support 114.

In the second frame 120 configured in this way, in a side view, the first attachment 121 and the second attachment 123 are vertically aligned and are positioned to at least partially overlap with the mast 122, which is formed extending in the up-down direction. Accordingly, a front-back direction width of the second frame 120 can be configured to be short (compact).

Next, a method of attaching the main frame 11 to the vehicle body 1 is explained.

First, the first frame 110 is fixed to the vehicle body 1. Specifically, as shown in FIG. 2, the first support part 111 is fixed to a right side surface of the body frame 2, and an area at a rear end portion of the second support part 112 is fixed to a right side surface of the transmission case 4.

In this way, the first frame 110 is fixed to the vehicle body 1 at two portions separated from each other (the first support part 111 and the second support part 112). Accordingly, the first frame 110 is stably fixed to the vehicle body 1.

Figure 2:
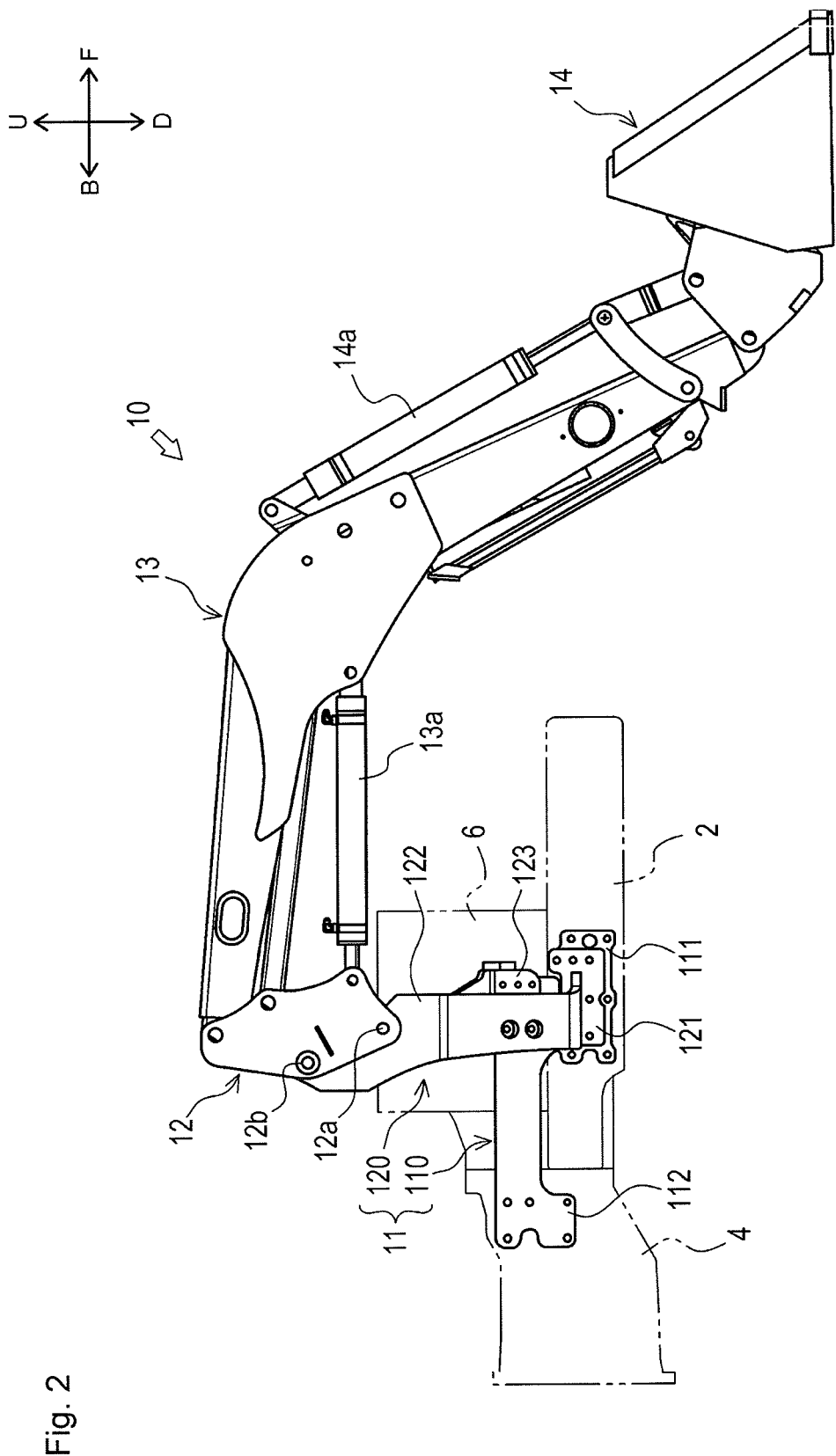
FIG. 2 is a lateral or side view of the front loader.

As shown in FIG. 2, the engine 6 is arranged on the body frame 2. The engine 6 includes piping and various engine accessories; therefore, the engine 6 normally projects further outward (outward in the left-right direction) than the body frame 2. However, in the main frame 11 according to the present embodiment, the second support part 112 is arranged displaced to the right (outside) with respect to the first support part 111, avoiding interference with the engine 6. Further, a portion (area) attached to the vehicle body 1 is secured by forming the second support part 112 so as to extend rearward and fixating the area at the rear end portion of the second support 112 to the transmission case 4.

Next, the second frame 120 is fixed to the first frame 110. Specifically, as shown in FIGS. 4 through 8, the left side surface 121a of the first attachment 121 abuts the right side surface 111a of the first support part 111 and the first attachment 121 is fixed to the first support part 111.

The left side surface 123a of the second attachment 123 abuts the right side surface 112a of the second support part 112 and the second attachment 123 is fixed to the second support part 112. In this case, the pin 112b provided on the second support part 112 is fitted into the engagement hole 123b provided on the second attachment 123.

A rear side surface 125a of the third attachment 125 abuts the front side surface 114a of the third support part 114 and the third attachment 125 is fixed to the third support part 114.

In this way, the first frame 110 and the second frame 120 are mutually fixed at three separate abutting surfaces (in other words, at the right side surface 111a and left side surface 121a (hereafter, simply referred to as "the right side surface 111a and the like"), at the right side surface 112a and left side surface 123a (hereafter, simply referred to as "the right side surface 112a and the like", and at the front side surface 114a and rear side surface 125a (hereafter, simply referred to as "the front side surface 114a and the like")). Accordingly, the three abutting surfaces can receive or distribute a load, allowing the first frame 110 and the second frame 120 to be fixed more firmly. In addition, by providing a plurality of abutting surfaces (three places), a large area for the abutting surfaces can be secured, and therefore the first frame 110 and the second frame 120 can be fixed more firmly.

The right side surface 111a and the right side surface 112a are independently arranged on different virtual planes (the first virtual plane P1 and the second virtual plane P2) and are arranged at positions respectively displaced in the up-down direction (different positions in the up-down direction). Similarly, the left side surface 121a and the left side surface 123a are independently arranged on different virtual planes (the third virtual plane P3 and the fourth virtual plane P4) and are arranged at positions respectively displaced in the up-down direction. Accordingly, the first frame 110 and the second frame 120 can be fixed more firmly compared to a case where the load is received by a single abutting surface.

Further, "displaced in the up-down direction" according to the present embodiment can mean that at least one of two portions (members) has a portion that does not overlap in the up-down direction with respect to the other portion. Similarly, "displaced in the front-back direction" according to the present embodiment can mean that at least one of two portions (members) has a portion that does not overlap in the front-back direction with respect to the other portion.

The fifth virtual plane P5 intersects vertically with the first virtual plane P1 and the second virtual plane P2. In other words, "the right side surface 111a and the like" and "the right side surface 112a and the like" are arranged vertically with respect to the front-back direction. In contrast, "the front side surface 114a and the like" is arranged vertically with respect to the left-right direction. Accordingly, the load applied to the second frame 120 in the left-right direction can be effectively received by "the right side surface 111a and the like" and "the right side surface 112a and the like" and the load applied to the second frame 120 in the front-back direction can be effectively received by "the front side surface 114a and the like."

In addition, by having the pin 112b be fitted into the engagement hole 123b, the load (especially a shear force acting between the right side surface 112a and the left side surface 123a) can be received by the pin 112b. Accordingly, the first frame 110 and the second frame 120 can be fixed more firmly.

Figure 3:
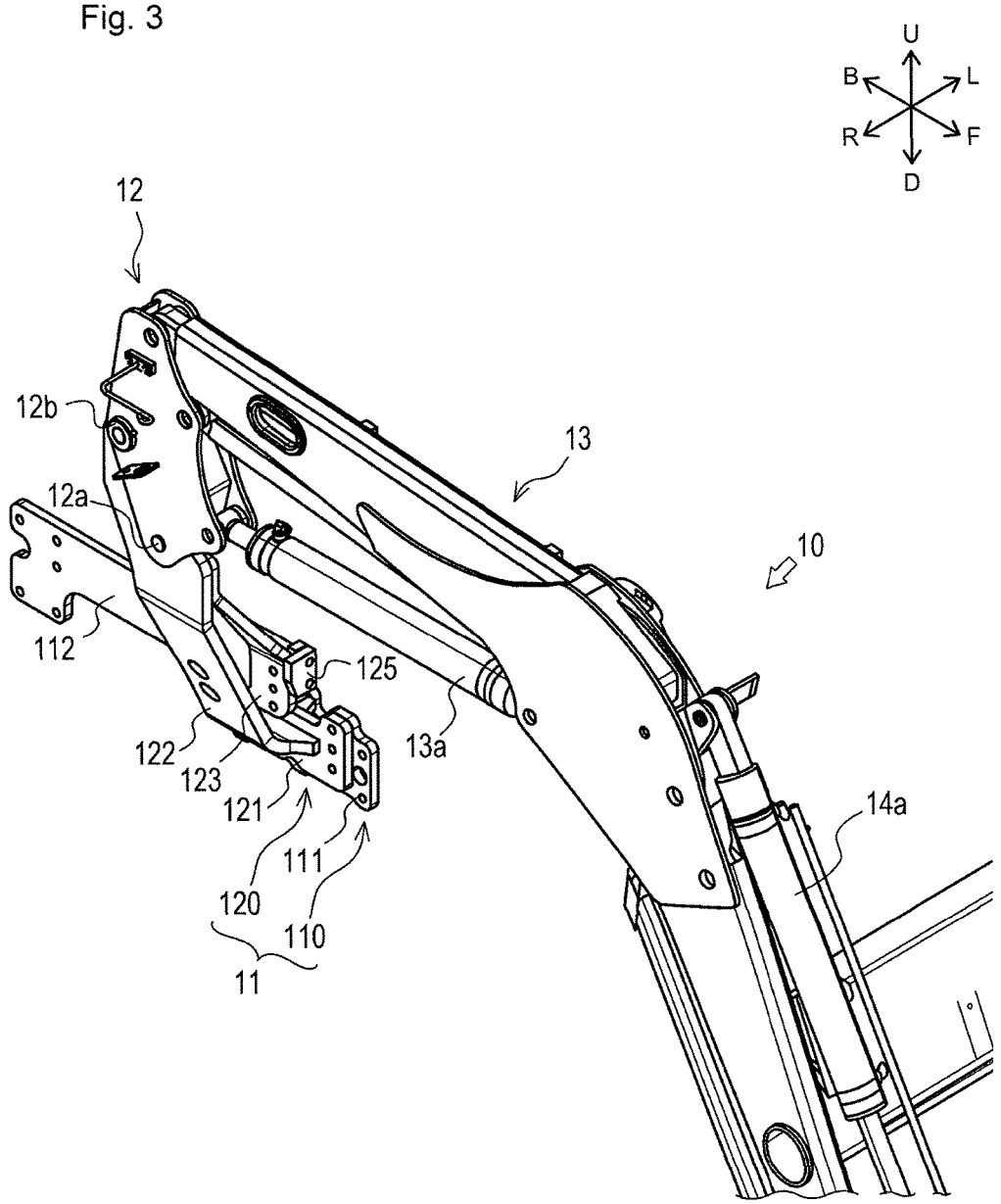
FIG. 3 is a perspective view of the front loader.
Figure 4:
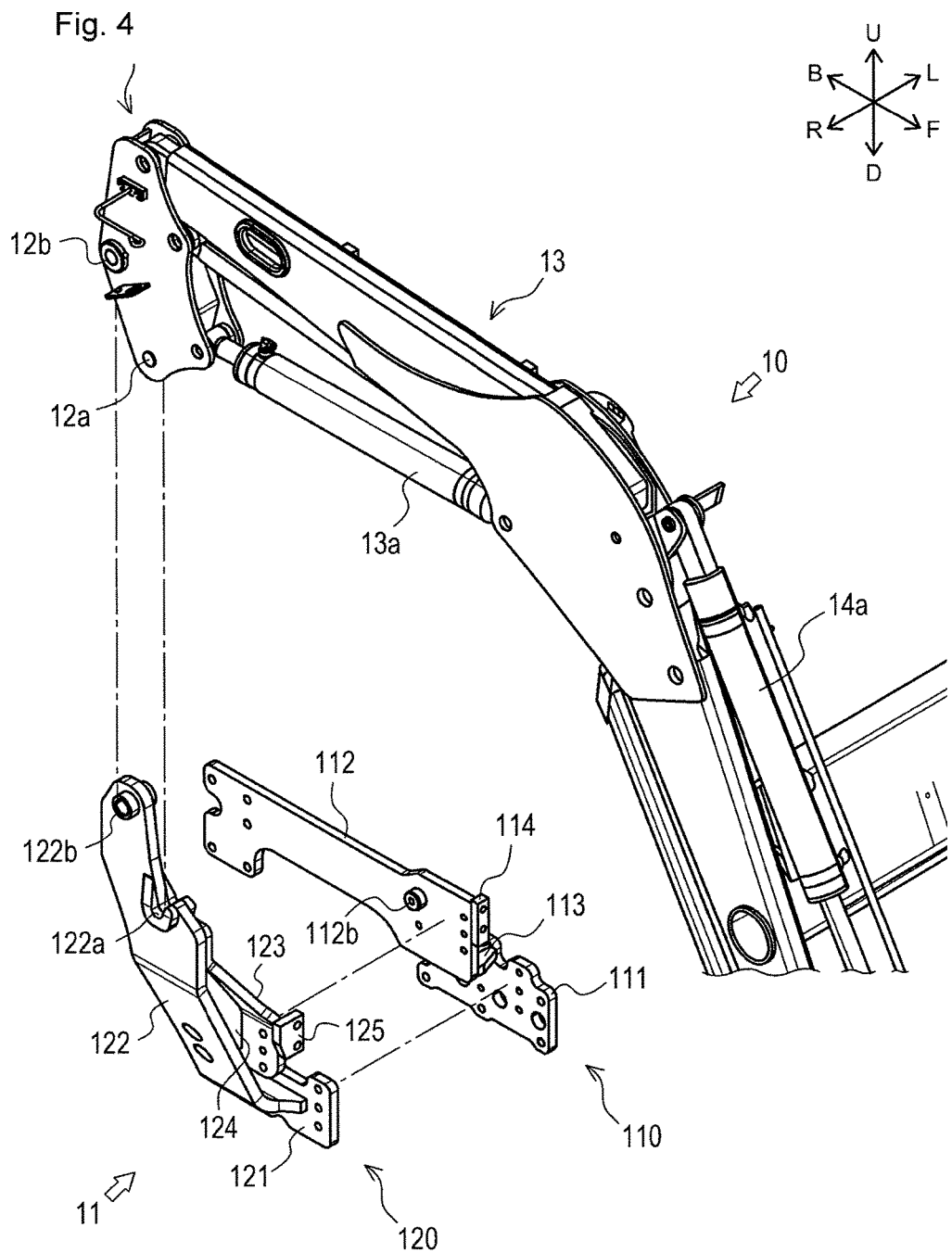
FIG. 4 is a partially exploded perspective view of the front loader.
Figure 5:
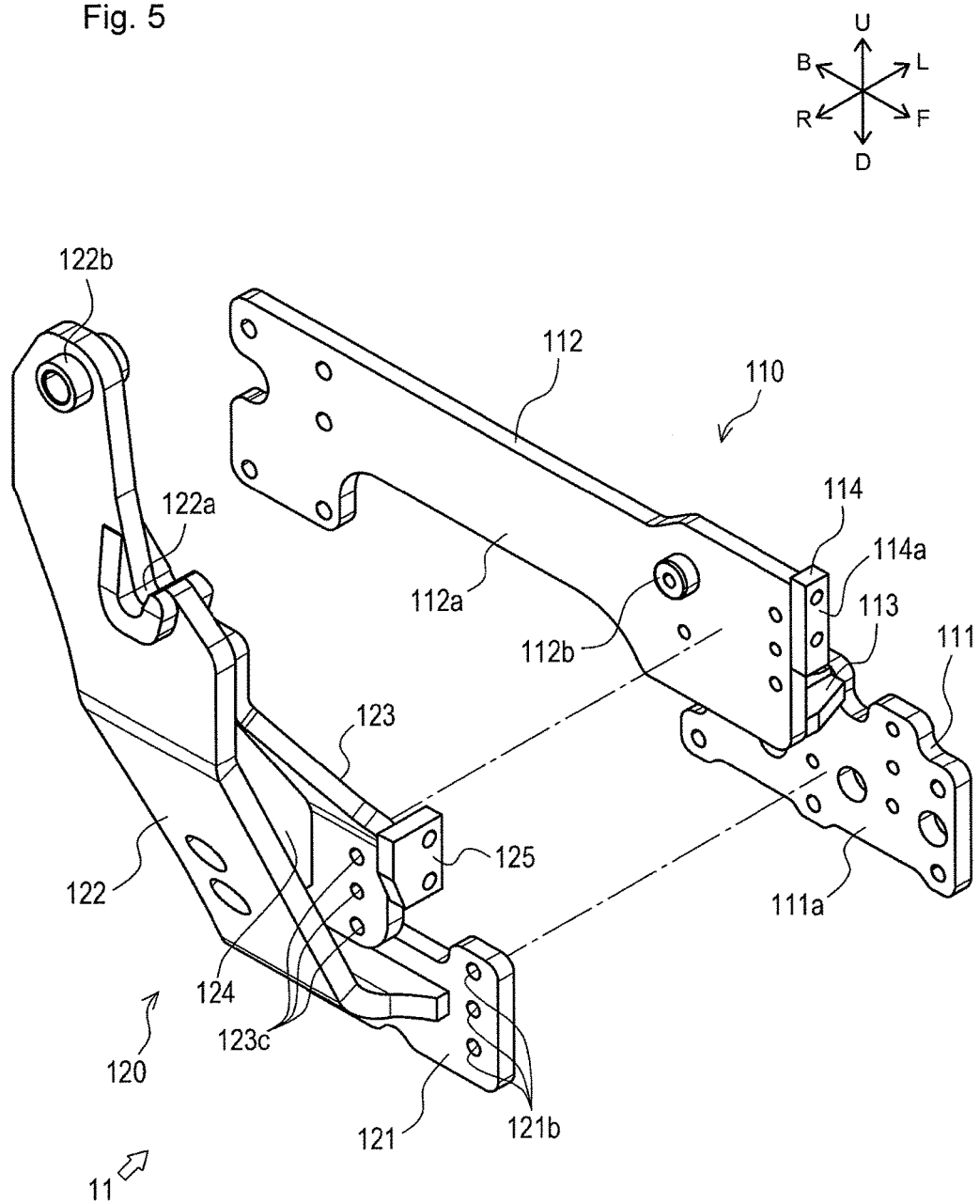
FIG. 5 is a forward exploded perspective view of a main frame.
Figure 6:
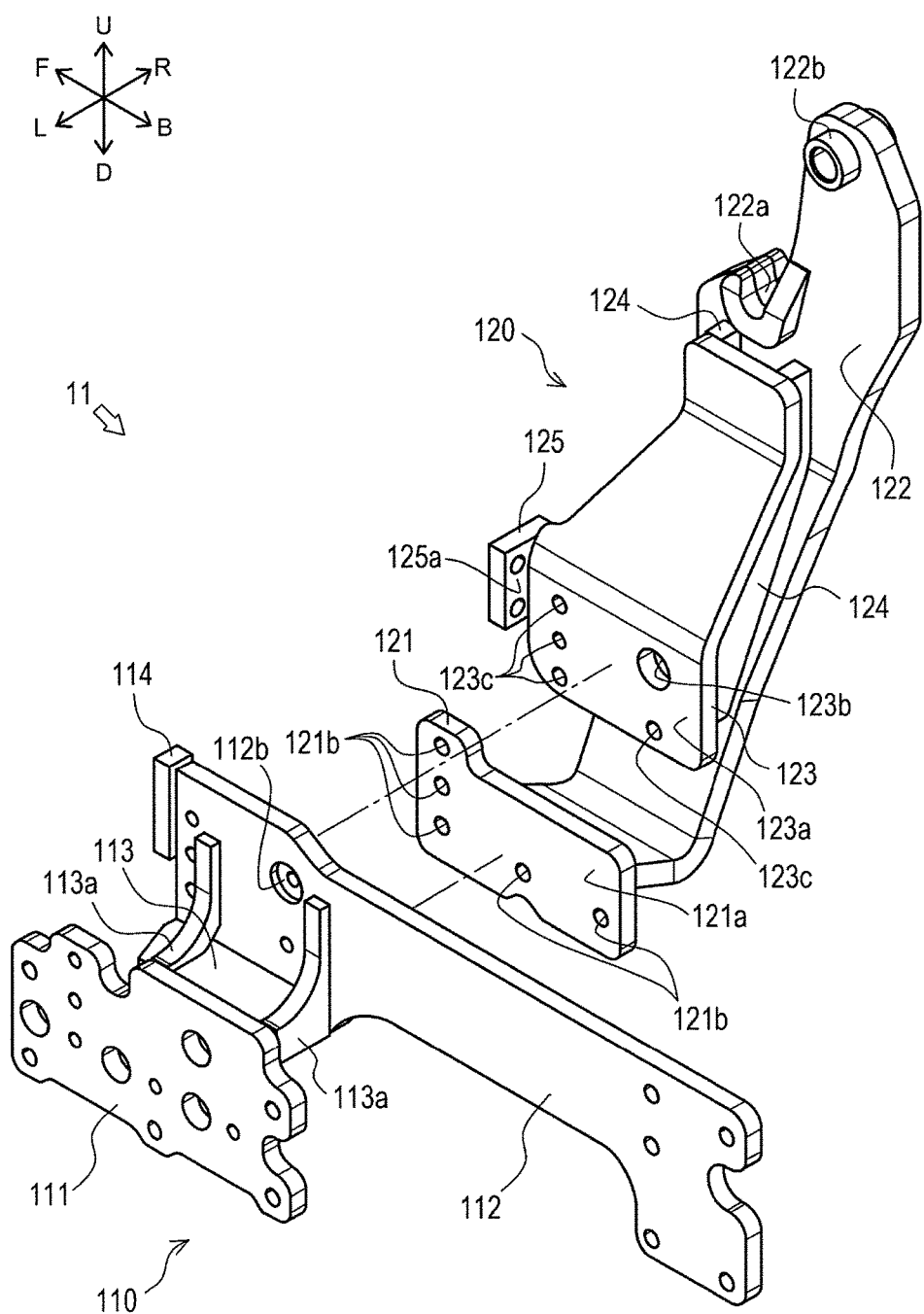
FIG. 6 is a rearward exploded perspective view of the main frame.
Figure 7:
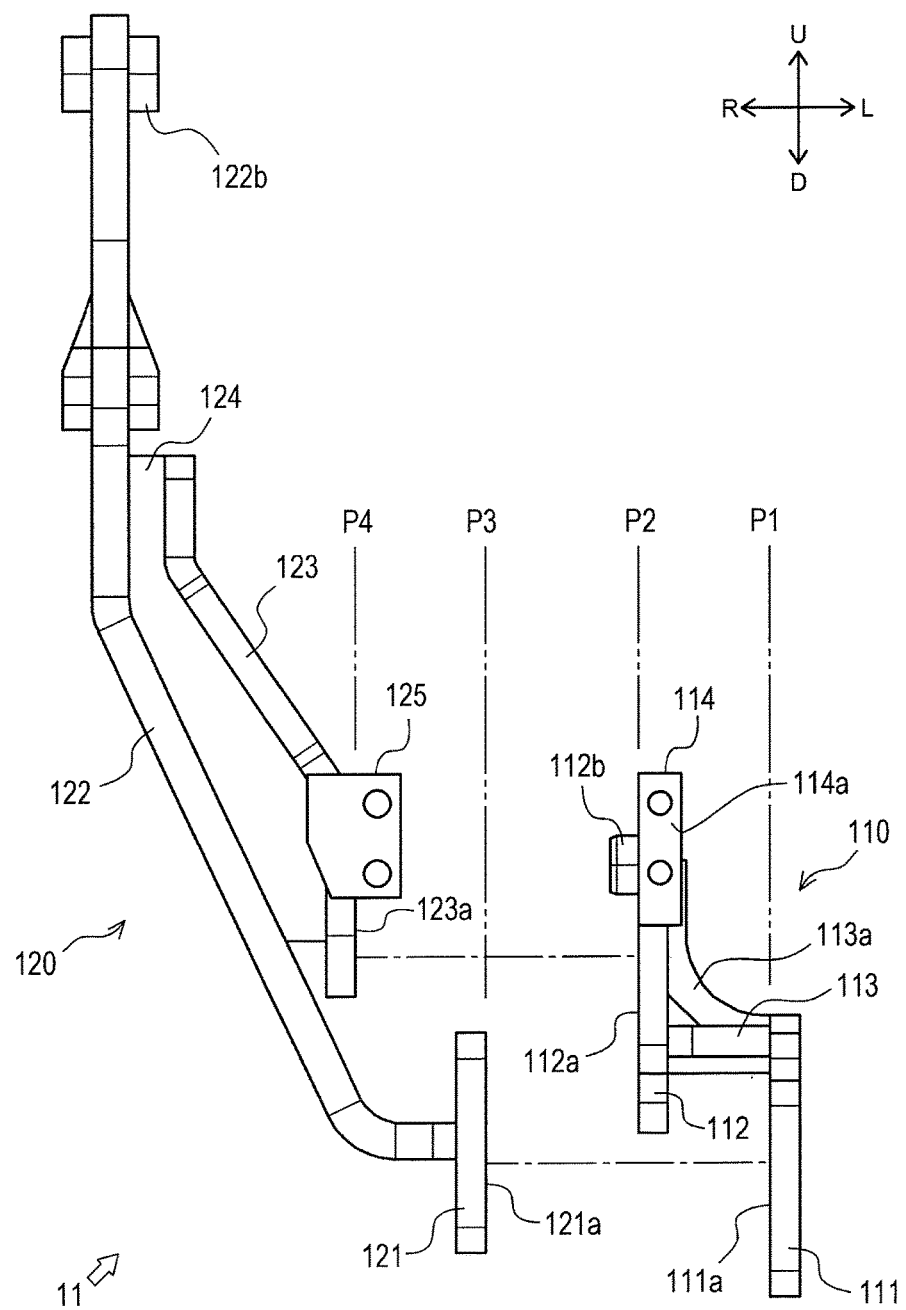
FIG. 7 is an exploded front view of the main frame.
Figure 8:
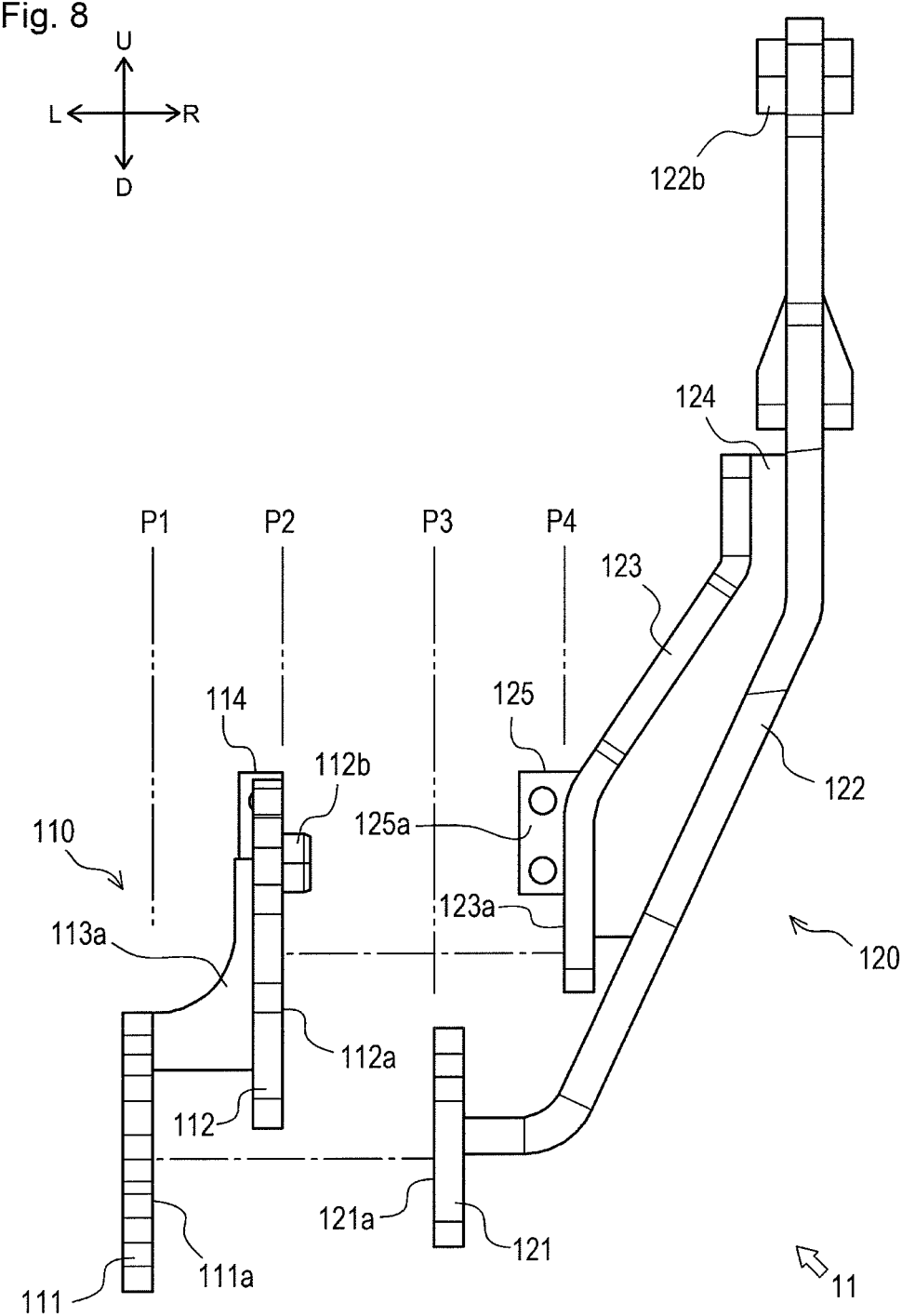
FIG. 8 is an exploded rear view of the main frame.
Figure 10A:
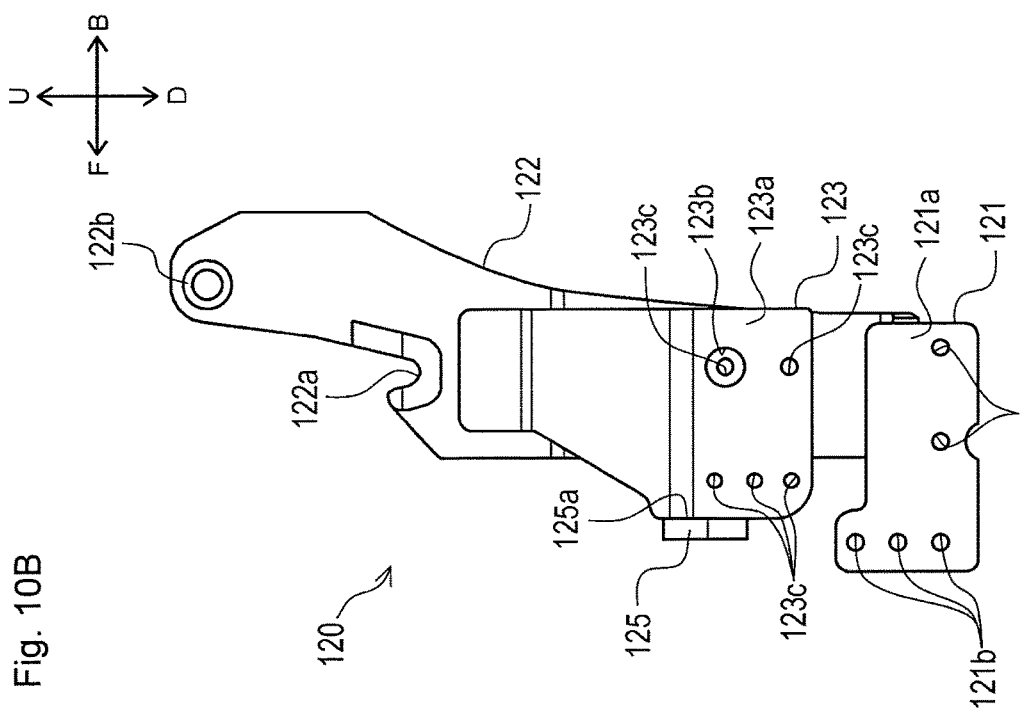
FIG. 10A is a right side view of a second frame.
Figure 10B:
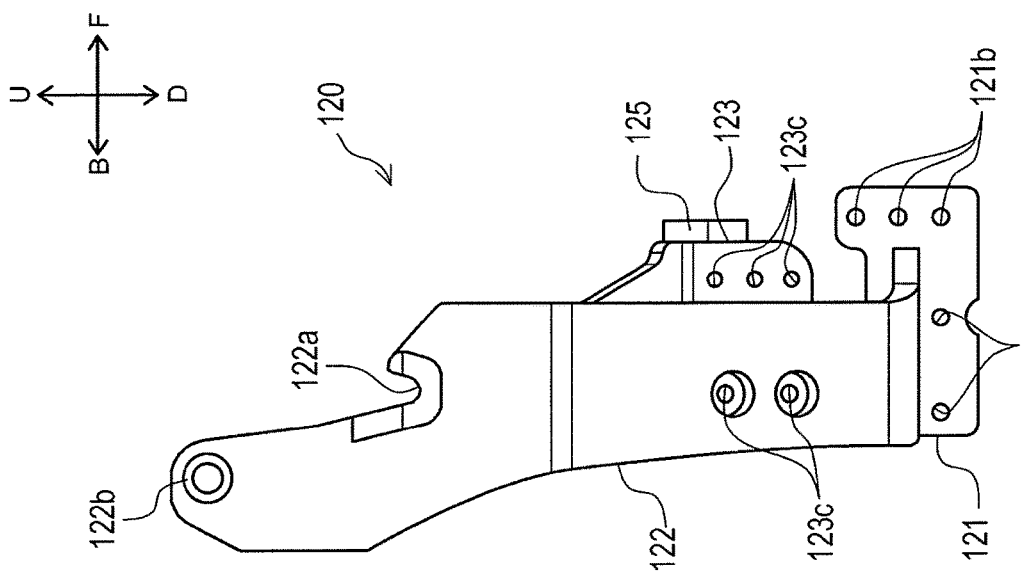
FIG. 10B is a left side view of the second frame.

In this way, the boom 13 is supported, via the coupling frame 12, on the main frame 11 that is attached to the vehicle body 1. Specifically, as shown in FIGS. 2 through 4, a supporting shaft 12a provided below the coupling frame 12 is inserted through the supporting groove 122a of the mast 122b. In this state, a boss 12b provided at the up-down direction middle portion of the coupling frame 12 is adjusted so as to be located on the same axis as the boss 122b of the mast 122 and a pin (not shown in the drawings) is inserted through the boss 12b and the boss 122b. Accordingly, the coupling frame 12 is coupled to the mast 122.

As noted above, the front loader 10 according to the present embodiment includes the first frame 110 and the second frame 120 on each of two sides. The first frame 110 is fixed to the vehicle body 1 and includes the first support part 111 having the right side surface 111*a* (a first support surface) arranged on the first virtual plane P1 (the first virtual support plane); and the second support part 112 having the right side surface 112*a* (a second support surface) arranged on the second virtual plane P2 (the second virtual support plane) which is different from the first virtual plane P1. The second frame 120 supports the boom 13 and includes the first attachment 121 that is fixed to the first support part 111 as well as having the left side surface 121*a* (a first attachment surface) abutting the right side surface 111*a*; and the second attachment 123 that is fixed to the second support part 112 as well as having the left side surface 123*a* (a second attachment surface) abutting the right side surface 112*a*. According to the configuration described above, strength can be enhanced by receiving the load on surfaces arranged on different virtual planes (in other words, on the right side surface 111*a* and the left side surface 121*a*, and on the right side surface 112*a* and the left side surface 123*a*).

In addition, the right side surface 112*a* is formed at a position displaced in the up-down direction with respect to the right side surface 111*a*. According to the configuration described above, the strength can be enhanced by receiving the load on surfaces formed at positions respectively displaced in the up-down direction (in other words, the right side surface 111*a* and the left side surface 121*a*, and the right side surface 112*a* and the left side surface 123*a*).

Further, the first frame 110 includes the third support part 114 having the front side surface 114*a* (a third support plane) arranged on the fifth virtual plane P5 (the third virtual support plane) that intersects the first virtual plane P1 and the second virtual plane P2. The second frame 120 includes the third attachment 125 that is fixed to the third support part 114 as well as having the rear side surface 125*a* (a third attachment surface) abutting the front side surface 114*a*. According to the configuration described above, the strength can be enhanced by receiving the load on the rear side surface 125*a* and the front side surface 114*a*.

In addition, the first frame 110 includes the pin 112*b* (a first engagement portion) formed in a projecting shape; and the second frame 120 includes the engagement hole 123*b* (a second engagement portion) formed in a recessed shape capable of engaging the pin 112*b*. According to the configuration described above, the strength can be enhanced by receiving the load on the pin 112*b* and the engagement hole 123*b*.

Further, the first frame 110 is fixed to the vehicle body 1 at the first support part 111 and the second support part 112. According to the configuration described above, the strength can be enhanced by receiving the load on the first support part 111 and the second support part 112.

The tractor (work vehicle) includes the front loader 10. With this configuration, the strength can be enhanced by receiving the load on the right side surface 111*a* and the left side surface 121*a*, and on the right side surface 112*a* and the left side surface 123*a*.

The left side surface 121*a* is an example of an embodiment of the first attachment surface according to the present invention. The left side surface 123*a* is an example of an embodiment of the second attachment surface according to the present invention. The mast 122 is an example of an embodiment of the support part according to the present invention. The engagement hole 123*b* is an example of an embodiment of the engagement portion according to the present invention. The second frame 120 is an example of an embodiment of the front loader frame according to the present invention. The tractor is an example of an embodiment of the work vehicle according to the present invention. The third virtual plane P3 is an example of an embodiment of one virtual plane according to the present invention. The fourth virtual plane P4 is an example of an embodiment of another virtual plane according to the present invention.

In the present embodiment, the first virtual plane P1 and the second virtual plane P2 are parallel; however, the present invention is not limited to this. In other words, the first virtual plane P1 and the second virtual plane P2 do not need to be mutually parallel as long as they are on different planes. Specifically, the first support part 111 and the second support part 112 of the first frame 110 are not necessarily parallel.

In the present embodiment, the fifth virtual plane P5 intersects vertically with the first virtual plane P1 and the second virtual plane P2; however, the present invention is not limited to this. In other words, as long as the fifth virtual plane P5 intersects the first virtual plane P1 and the second virtual plane P2, the fifth virtual plane P5 does not have to intersect vertically and perpendicularly with the first virtual plane P1 and the second virtual plane P2.

In the present invention, the first support part 111 (the right side surface 111*a*) and the second support part 112 (the right side surface 112*a*) are arranged displaced in the up-down direction in a partially overlapping state in a side view; however, the present invention is not limited to this. In other words, as long as the right side surface 111*a* and the right side surface 112*a* are arranged displaced in the up-down direction, the surfaces 111*a* and 112*a* can be arranged so as not to overlap at all or such that a majority thereof overlaps in a side view, for example.

In addition, the surfaces in mutual contact (the right side surface 111*a* of the first support part 111 and the left side surface 121*a* of the first attachment 121, the right side surface 112*a* of the second support part 112 and the left side surface 123*a* of the second attachment 123, and the front side surface 114*a* of the third support part 114 and the rear side surface 125*a* of the third attachment 125) can be different shapes from each other.

In the present embodiment, the pin 112*b* in the projecting shape is provided on the first frame 110, and the engagement hole 123*b* in the recessed shape is provided on the second frame 120; however, the present invention is not limited to this. For example, it is possible to provide a projecting shaped pin on the second frame 120 and a recess shaped engagement hole on the first frame 110. In the present embodiment, the recess shaped engagement hole 123*b* is a through hole that runs through the second attachment 123; however, the present invention is not limited thereto and a hole having a bottom surface (not a through hole) can be used.

In the present embodiment, the first frame 110 is fixed to the body frame 2 of the vehicle body 1 and the transmission case 4; however, the present invention is not limited to this. In other words, as long as the first frame 110 is fixed to the vehicle body 1, there is no limitation on the portion to which the first frame 110 is fixated.

In the present embodiment, the first frame 110 is fixed to the vehicle body 1 at the first support part 111 and the second support part 112; however, the present invention is not limited to this. Specifically, a configuration is also possible in which the first frame 110 is fixed to the vehicle body 1 at either one of the first support part 111 or the second support part 112. In addition, apart from the first support part 111 and the second support part 112, a configuration is also possible in which a portion to be fixated to the vehicle body 1 is formed on the first frame 110 and the first frame 110 is fixed to the vehicle body 1 at this portion.

In the present embodiment, the tractor (see FIG. 1) is shown as an example of the work vehicle equipped with the front loader 10; however, the present invention is not limited to this. Specifically, a configuration of the tractor equipped with the front loader 10 is not limited to that of the present embodiment. In addition, the work vehicle equipped with the front loader 10 can be other agricultural vehicles, construction vehicles, industrial vehicles, and the like.

In the following, another embodiment of the front loader 10 (in particular, the first frame 110) is described.

Figure 11B:
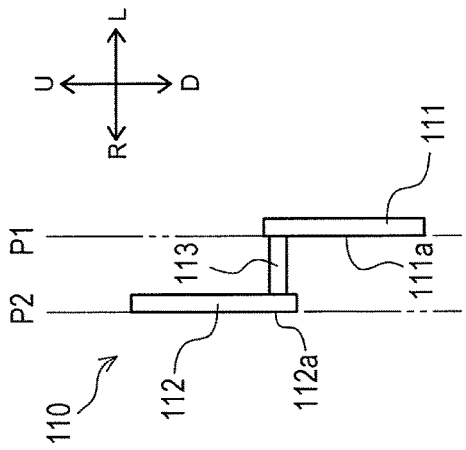
FIG. 11B is a front schematic view of the first frame according to the first embodiment.
Figure 11D:
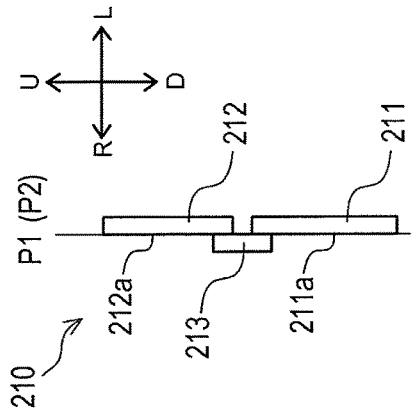
FIG. 11D is a front schematic view of the first frame according to the second embodiment.
Figure 11A:
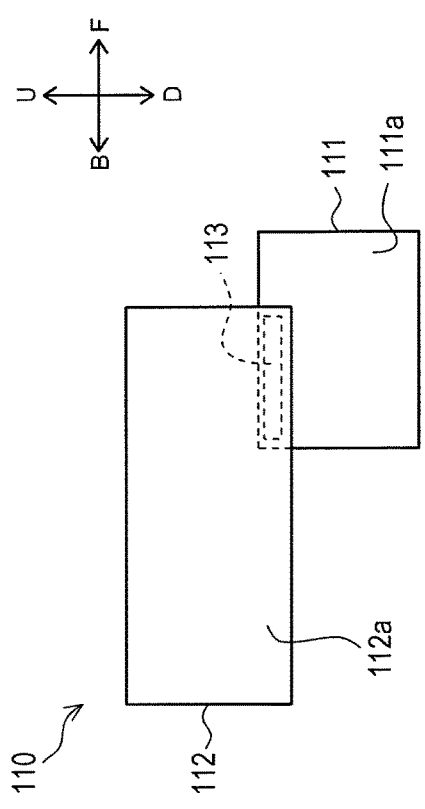
FIG. 11A is a side schematic view of a first frame according to the first embodiment.

As shown in FIGS. 11A and 11B, in the first frame 110 according to a first embodiment, the right side surface 111a of the first support part 111 and the right side surface 112a of the second support part 112 are arranged on different virtual planes from each other (the first virtual plane P1 and the second virtual plane P2, respectively). In the first frame 110 according to the first embodiment, the right side surface 111a and the right side surface 112a are also formed in positions respectively displaced in the up-down direction.

Figure 11C:
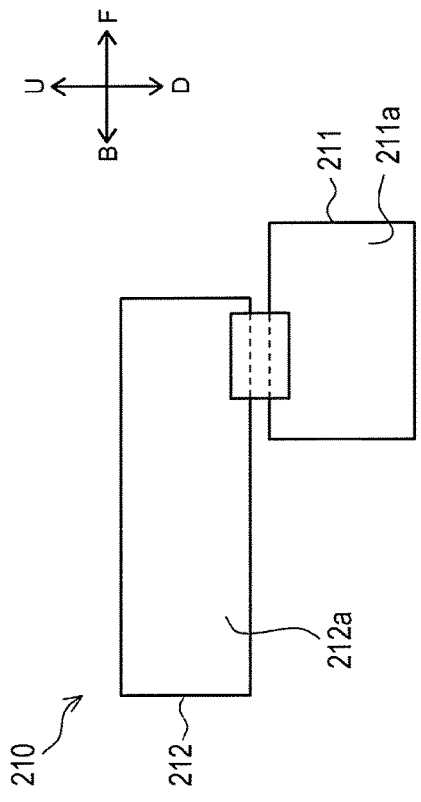
FIG. 11C is a side schematic view of a first frame according to a second embodiment.

However, in a first frame 210 according to a second embodiment shown in FIGS. 11C and 11D, a configuration is possible in which a right side surface 211a of a first support part 211 and a right side surface 212a of a second support part 212 are mutually arranged on the same virtual plane. In this case, the first support part 211 and the second support part 212 are arranged displaced in the up-down direction (vertically aligned). In addition, in this case, the first support part 211 and the second support part 212 are coupled by a coupling part 213 that is fixed to the right side surface 211a and the right side surface 212a, for example.

In the second embodiment mentioned above, the first support part 211 and the second support part 212 are arranged displaced in the up-down direction; however, a configuration is possible in which the first support part 211 and the second support part 212 are arranged displaced in the front-back direction.

Figure 12A:
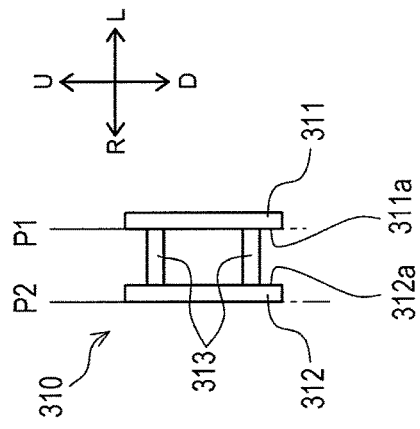
FIG. 12A is a side schematic view of a first frame according to a third embodiment.
Figure 12B:
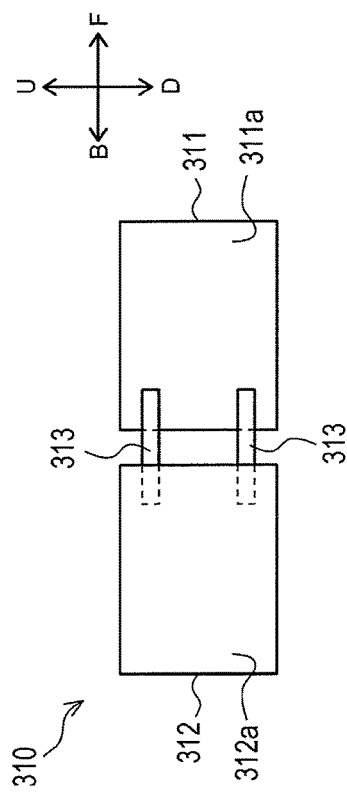
FIG. 12B is a front schematic view of the first frame according to the third embodiment.

In addition, in a first frame 310 according to a third embodiment shown in FIGS. 12A and 12B, a configuration is possible in which a right side surface 311a of a first support part 311 and a right side surface 312a of a second support part 312 are formed in positions respectively displaced in the front-back direction. In this case, the first support part 311 and the second support part 312 are coupled by coupling parts 313 that are fixed to the right side surface 311a of the first support part 311 and the left side surface of the second support part 312.

Figure 12C:
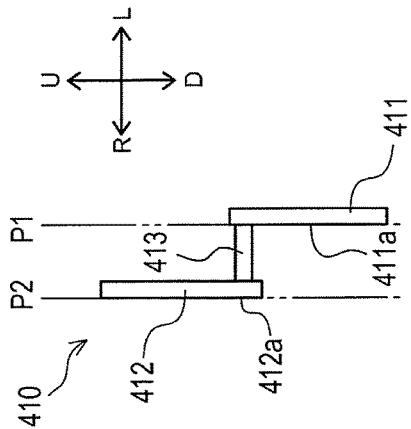
FIG. 12C is a side schematic view of a first frame according to a fourth embodiment.
Figure 12D:
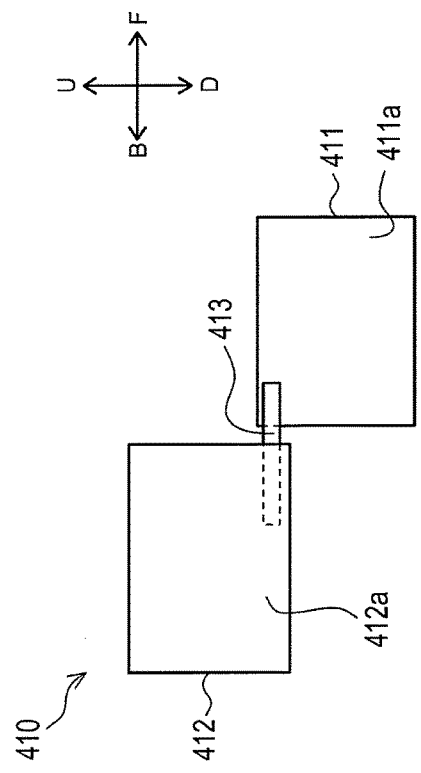
FIG. 12D is a front schematic view of the first frame according to the fourth embodiment.

In addition, in a first frame 410 according to a fourth embodiment shown in FIGS. 12C and 12D, a configuration is possible in which a right side surface 411a of a first support part 411 and a right side surface 412a of a second support part 412 are formed in positions respectively displaced in the up-down direction and the front-back direction. In this case, the first support part 411 and the second support part 412 are coupled by a coupling part 413 fixed to the right side surface 411a of the first support part 411 and the left side surface of the second support part 412, for example.

In the fourth embodiment mentioned above, the right side surface 411a and the right side surface 412a are formed in positions respectively displaced in the up-down direction and the front-back direction; however, the present invention is not limited to this. For example, the right side surface 411a and the right side surface 412a can be formed in positions that are not displaced in the up-down direction or the front-back direction (in other words, to align in the left-right direction).

Figure 14:
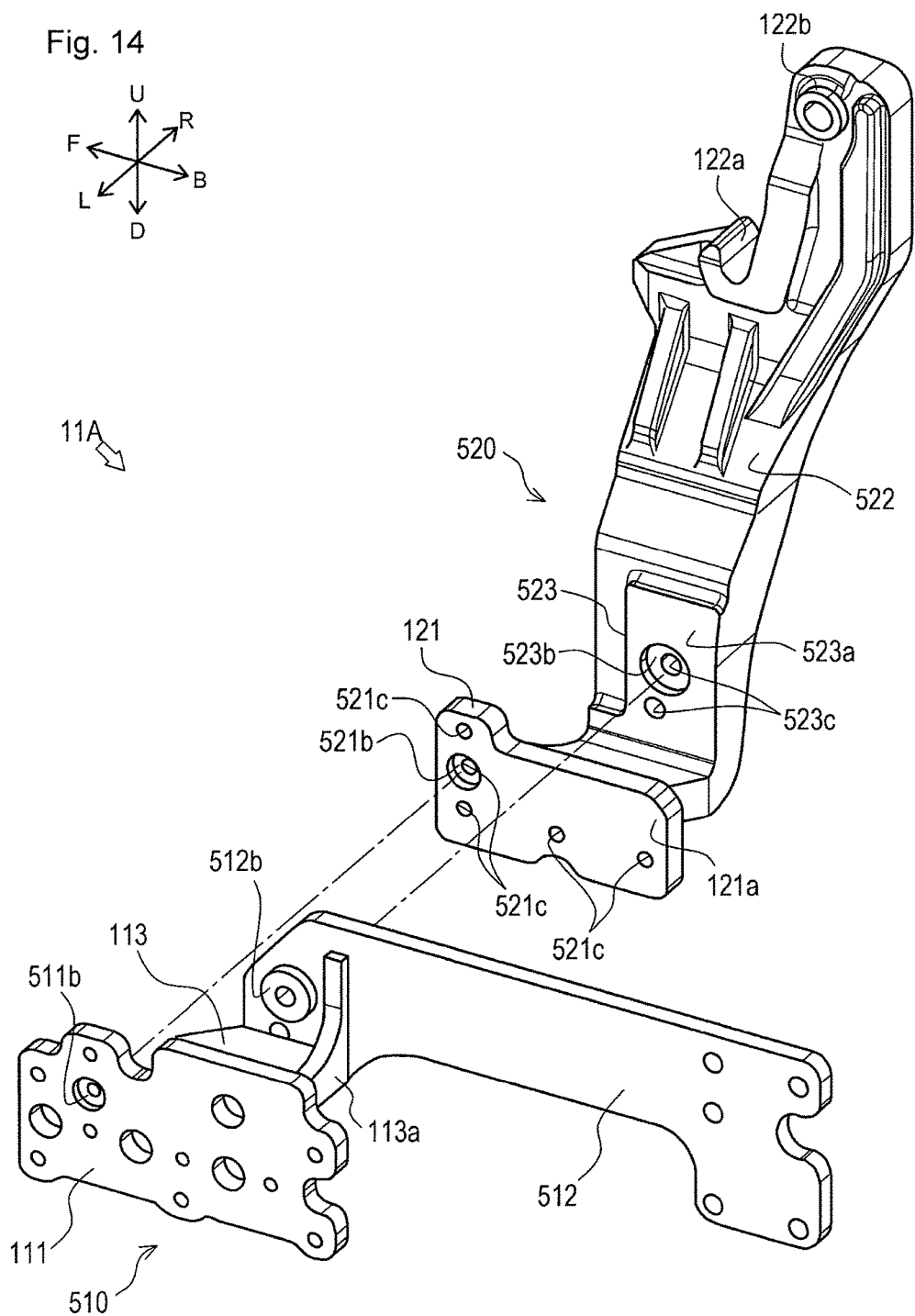
FIG. 14 is a rearward exploded perspective view of the main frame according to the fifth embodiment.
Figure 15:
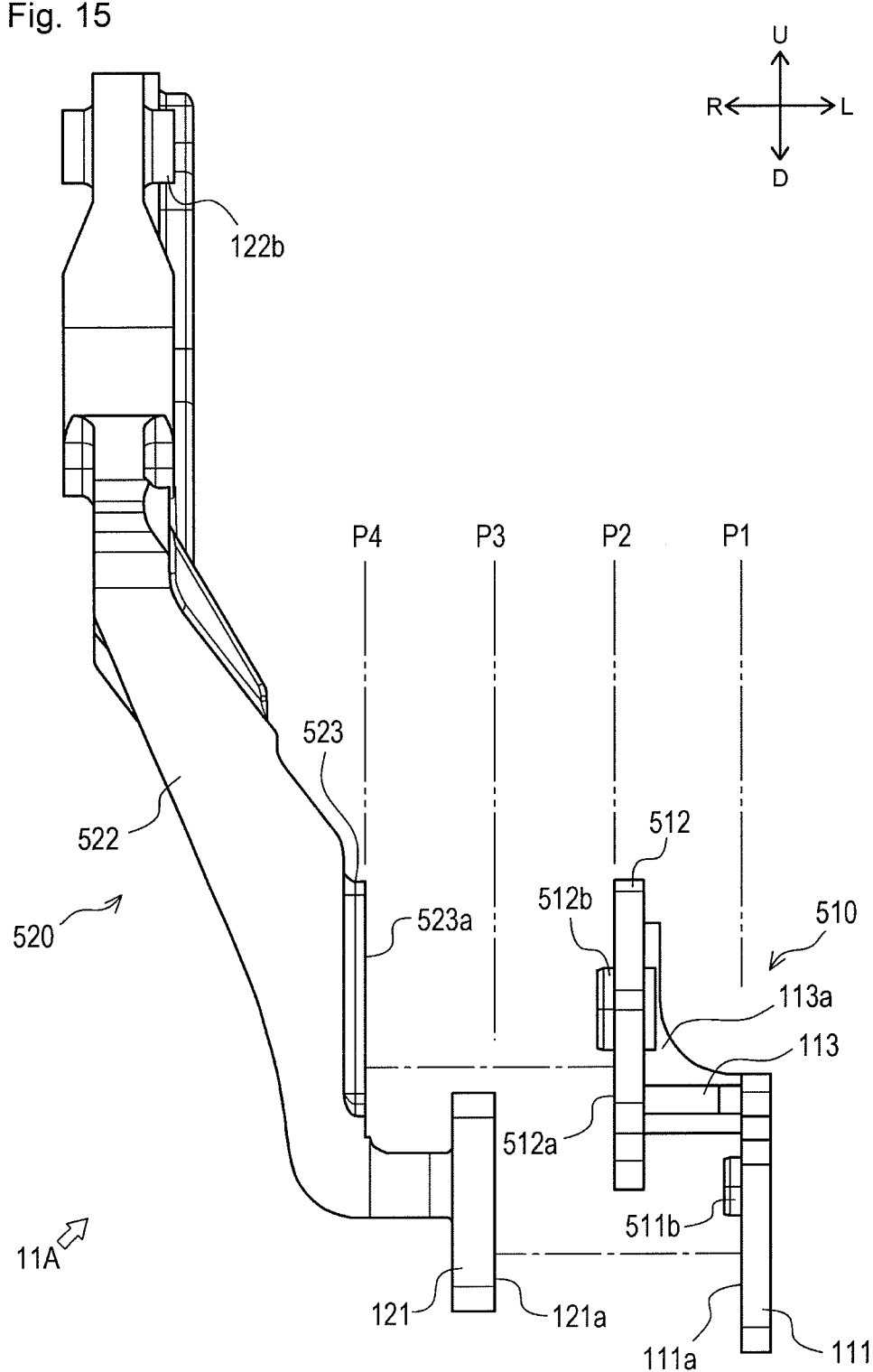
FIG. 15 is an exploded front view of the main frame according to the fifth embodiment.

In the following, a configuration of a main frame 11A (a first frame 510 and a second frame 520) according to a fifth embodiment is explained using FIGS. 13 through 15. In the description below, only configurations that are different from the main frame 11 (the first frame 110 and the second frame 120) according to the first embodiment are described. Specifically, identical reference numerals are assigned to configurations that are substantially identical to those of the first embodiment and descriptions thereof are omitted where appropriate.

The first frame 510 primarily differs from the first frame 110 according to the first embodiment in that a pin 511b is provided on the first support part 111; a second support part 512 is provided in place of the second support part 112; and the third support part 114 is not provided. A detailed description follows.

The pin 511b is provided on the first support part 111 of the first frame 510. The pin 511b is substantially a cylindrically shaped member with an axis direction oriented in the left-right direction. A left end portion of the pin 511b is fitted into and fixed to a through hole formed so as to run through the front upper portion of the first support part 111 in the left-right direction. In this way, the pin 511b is provided so as to project (circular shape) toward the right from the right side surface 111a of the first support part 111.

The front-back direction length of the second support part 512 of the first frame 510 is formed to be shorter than the second support part 112 (see FIG. 5) of the first frame 110 according to the first embodiment. Specifically, the second support part 512 is formed in a shape having the front end portion of the second support part 112 cut away. A right side surface 512a of the second support part 512 is arranged on the second virtual plane P2 in the same way as the first embodiment.

The pin 512b is provided on the second support part 512. The pin 512b is substantially a cylindrically shaped member with an axis direction oriented in the left-right direction. A left-right direction middle part of the pin 512b is fitted into and fixed to a through hole formed so as to run through a front upper portion of the second support part 512 in the left-right direction. In this way, the pin 512b is provided so as to project (and being circular in shape) toward the right from the right side surface 512a of the second support part 512. A diameter of the pin 512b is formed so as to be greater than a diameter of the pin 112b according to the first embodiment.

The second frame 520 primarily differs from the second frame 120 according to the first embodiment in that an engagement recessed portion 521b is provided on the first attachment 121; a through hole 521c is formed in place of the through hole 121b; a mast 522 and a second attachment 523 are provided in place of the mast 122, the second attachment 123, and the coupling part 124; and the third attachment 125 is not provided. A detailed description follows.

The engagement recessed portion 521b is provided on the first attachment 121 of the second frame 520. The engagement recessed portion 521b is formed by recessing a front portion of the left side surface 121a of the first attachment 121 to the right. An inner diameter of the engagement recessed portion 521b is formed to be substantially identical to an external diameter of the pin 511b provided on the first support part 111.

A plurality of through holes 521c are formed on the first attachment 121 of the second frame 520. The through hole 521c is formed in a circular shape so as to run through the first attachment 121 in the left-right direction. There are five through holes 521c formed at an appropriate distance from one another on the first attachment 121. Specifically, three through holes 521c are formed so as to align vertically in a front portion of the first attachment 121. In addition, one through hole 521c is formed at each of the lower portion and the rear lower portion in the front-back direction middle part of the first attachment 121. In addition, one of the three through holes 521c (the through hole 521c in the center) that is formed in the front portion of the first attachment 121 is formed on a bottom portion of the engagement recessed portion 521b. A bolt is inserted through the through hole 521c to fixate the first attachment 121 to the first support part 111. Further, an appropriate through hole is formed on the first support part 111 at a location corresponding to the through hole 521c.

A lower end of the mast 522 of the second frame 520 is fixed to the right side surface of the first attachment 121. An upper portion of the mast 522 is formed so as to extend to an upper right from the first attachment 121. An area at a top end portion of the mast 522 is formed vertically with respect to the left-right direction. In this way, the mast 522 is formed so as to extend in the up-down direction in a side view. The supporting groove 122a and the boss 122b are formed on the mast 522 in the same way as on the mast 122 according to the first embodiment.

A second attachment 523 is formed in a plate shape. The second attachment 523 is integrally formed with the mast 522 at the lower portion of the left side surface of the mast 522. Accordingly, the second attachment 523 is arranged at a right upper area of the first attachment 121 in a front view (or a rear view). A left side surface 523a of the second attachment 523 is arranged so as to face a front portion of the right side surface 512a of the second support part 512. The left side surface 523a of the second attachment 523 is arranged on the fourth virtual plane P4 that is vertical to the left-right direction. An engagement recessed portion 523b is formed on the second attachment 523.

The engagement recessed portion 523b is formed by recessing the left side surface 523a of the second attachment 523 to the right. The inner diameter of the engagement recessed portion 523b is formed so as to be substantially identical to the external diameter of the pin 512b provided on the second support part 512.

A plurality of through holes 523c are formed on the second attachment 523. The through hole 523c is formed in a circular shape so as to run through the second attachment 523 in the left-right direction. There are two through holes 523c formed at an appropriate distance from each other on the second attachment 523. Specifically, one through hole 523c is formed on the bottom portion of the engagement recessed portion 523b. The other through hole 523c is formed below (front lower side) the engagement recessed portion 523b. A bolt is inserted through the through hole 523c to fixate the second attachment 523 to the second support part 512. Further, an appropriate through hole is formed on the second support part 512 at a location corresponding to the through hole 523c.

Next, a method of attaching the main frame 11A to the vehicle body 1 is explained. A method to fixate the first frame 510 to the vehicle body 1 is the same as the first embodiment, so the description thereof is omitted.

After the first frame 510 is fixed to the vehicle body 1, the second frame 520 is fixed to the first frame 510. Specifically, the left side surface 121a of the first attachment 121 abuts the right side surface 111a of the first support part 111, and the first attachment 121 is fixed to the first support part 111. Accordingly, the first attachment 121 is fixed to the vehicle body 1 via the first support part 111. In this case, the pin 511b provided on the first support part 111 is fitted into the engagement recessed portion 521b that is provided on the first attachment 121. Accordingly, the engagement recessed portion 521b is engaged with the vehicle body 1 via the pin 511b.

In addition, the left side surface 523a of the second attachment 523 abuts a front portion of the right side surface 512a of the second support part 512, and the second attachment 523 is fixed to the second support part 512. Accordingly, the second attachment 523 is fixed to the vehicle body 1 via the second support part 512. In this case, the pin 512b provided on the second support part 512 is fitted into the engagement recessed portion 523b that is provided on the second attachment 523. Accordingly, the engagement recessed portion 523b is engaged with the vehicle body 1 via the pin 512b.

In this way, the first frame 510 and the second frame 520 are mutually fixed to abutting surfaces at two separate locations (in other words, the right side surface 111a and left side surface 121a (hereafter, simply referred to as "the right side surface 111a and the like") and the right side surface 512a and left side surface 523a (hereafter, simply referred to as "the right side surface 512a and the like"). Accordingly, the two abutting surfaces can receive the load, allowing the first frame 510 and the second frame 520 to be fixed more firmly. In addition, by providing a plurality of abutting surfaces (two places), a large area for the abutting surfaces can be secured, and therefore the first frame 510 and the second frame 520 can be fixed more firmly.

In addition, the right side surface 111a and the right surface 512a are independently arranged on different virtual planes (the first virtual plane P1 and the second virtual plane P2) and are arranged at positions respectively displaced in the up-down direction. Similarly, the left side surface 121a and the left side surface 523a are independently arranged on different virtual planes (the third virtual plane P3 and the fourth virtual plane P4) and are arranged at positions respectively displaced in the up-down direction. Accordingly, the first frame 510 and the second frame 520 can be fixed more firmly compared to a case where the load is received by a single abutting surface.

In addition, by the pin 511b and the pin 512b being fitted into the engagement recessed portion 521b and the engagement recessed portion 523b, respectively, the load can be received by the pin 511b and the pin 512b. Accordingly, the first frame 510 and the second frame 520 can be fixed more firmly.

The left side surface 523a is an example of an embodiment of the second attachment surface according to the present invention. The mast 522 is an example of an embodiment of the support part according to the present invention. The engagement recessed portions 521b and 523b are examples of an embodiment of the engagement portion according to the present invention.

In the present embodiment, the engagement portion is formed in the front area of the first attachment surface. Accordingly, the strength can be enhanced on the front portion of the first attachment surface.

In addition, the first attachment includes a plurality of the first through holes (through hole 521c), through which the bolts are inserted to fixate the first attachment to the vehicle body. A plurality of the first through holes are formed at a distance from each other. Specifically, there are five first through holes. One of the first through holes is formed inside the engagement portion that is formed on the first attachment (the first attachment surface). Another one of the first through holes is formed at an upper side of the engagement portion. Another one of the first through holes is formed at a lower side of the engagement portion. Accordingly, the first attachment is properly fixed to the vehicle body.

In addition, the second attachment is integrally formed with the mast, which supports the boom. Thus, the number of components and manufacturing costs can be reduced.

In addition, the second attachment is arranged outward and upward from the first attachment. Accordingly, the first attachment and the second attachment can be arranged respectively displaced in the width direction of the vehicle body (the left-right direction) and the up-down direction; therefore, the strength can be effectively enhanced.

In addition, the second attachment includes a plurality of the second through holes (through hole 523c), through which the bolts are inserted to fixate the second attachment to the vehicle body. A plurality of the second through holes are formed at a distance from each other. Specifically, there are two of the second through holes. One of the second through holes is formed inside the engagement portion that is formed on the second attachment (the second attachment surface). The other of the second through holes is formed at a lower side of the engagement portion. Accordingly, the second attachment can be properly fixed to the vehicle body.

In addition, the engagement portion is formed so as to be capable of engaging with the projecting portions (pins 511b and 512b) formed in the circular shape that protrudes outward from the vehicle body. Accordingly, the strength can be enhanced.

In addition, the engagement portion is formed to have a circular cross section. The projecting portions are formed in substantially a cylindrical shape. Accordingly, a simple configuration of the engagement portion and the projecting portion is possible.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A front loader frame configured to mount a boom to a work vehicle, comprising:
   a first attachment having a first attachment surface oriented on a first virtual plane and being configured to be fixable to one portion of a vehicle body of the work vehicle;
   said first attachment comprising mounting openings and being arranged on a first frame member;
   a second attachment having a second attachment surface oriented on a different virtual plane from the first virtual plane and being configured to be fixable to another and different portion of the vehicle body of the work vehicle;
   said second attachment comprising mounting openings and being arranged on the first frame member;
   said first and second attachment surfaces being spaced from one another in a lateral direction of the vehicle body of the work vehicle;
   a third attachment portion arranged on a second frame member and being connectable to the first attachment;
   said third attachment portion comprising a third attachment surface;
   a fourth attachment portion arranged on a second frame member and being connectable to the second attachment;
   said fourth attachment portion comprising a fourth attachment surface; and
   said third and fourth attachment surfaces are spaced from one another in a lateral direction of the vehicle body of the work vehicle.

2. The front loader frame according to claim 1, wherein the second attachment surface is spaced, in an up-down direction, with respect to the first attachment surface.

3. The front loader frame according to claim 1, further comprising:
   an engagement portion configured to prevent movement along at least one direction between the first and second attachment surfaces.

4. The front loader frame according to claim 3, wherein the engagement portion comprises a projection or recess arranged on at least one of the first attachment and the second attachment.

5. A work vehicle comprising:
   a boom; and
   the front loader frame according to claim 1.

6. The front loader frame according to claim 1, wherein a bottom portion of the second attachment is located vertically below an upper portion of the first attachment, whereby the first and second attachments overlap one another when viewed from a front to back direction of the vehicle body.

7. The front loader frame according to claim 1, wherein the first attachment surface is directly fixed to the one portion a vehicle body of the work vehicle; and
   the second attachment surface is directly fixed to the other and different portion of the vehicle body of the work vehicle.

8. The front loader frame according to claim 1, wherein the third attachment portion is directly fixable via mounting openings to the first attachment; and
   the fourth attachment portion is directly fixable via mounting openings to the second attachment.

9. A front loader frame configured to mount a boom to a work vehicle, comprising:
   a first attachment having a first attachment surface oriented on a first virtual plane and being configured to be fixable to one portion of a vehicle body of the work vehicle;
   said first attachment comprising mounting openings and being arranged on a first frame member;
   a second attachment having a second attachment surface oriented on a different virtual plane from the first virtual plane and being configured to be fixable to another and different portion of the vehicle body of the work vehicle;

said second attachment comprising mounting openings and being arranged on the first frame member;

said first and second attachment surfaces being spaced from one another in a lateral direction of the vehicle body of the work vehicle;

a third attachment portion arranged on a second frame member and being connectable to the first attachment and comprising a third attachment surface;

a fourth attachment portion arranged on a second frame member and being connectable to the second attachment and comprising a fourth attachment surface;

said third and fourth attachment surfaces being spaced from one another in a lateral direction of the vehicle body of the work vehicle; and said second frame member comprising a mast for mounting the boom to the work vehicle and being removably connectable to the first frame member.

10. The front loader frame according to claim 9, wherein the second attachment surface is spaced, in an up-down direction, with respect to the first attachment surface.

11. The front loader frame according to claim 9, further comprising:
an engagement portion configured to prevent movement along at least one direction between the first and second attachment surfaces.

12. The front loader frame according to claim 11, wherein the engagement portion comprises a projection or recess arranged on at least one of the first attachment and the second attachment.

13. A work vehicle comprising:
a boom; and
the front loader frame according to claim 9.

14. The front loader frame according to claim 9, wherein a bottom portion of the second attachment is located vertically below an upper portion of the first attachment, whereby the first and second attachments overlap one another when viewed from a front to back direction of the vehicle body.

15. The front loader frame according to claim 9, wherein the first attachment surface is directly fixed to the one portion a vehicle body of the work vehicle; and the second attachment surface is directly fixed to the other and different portion of the vehicle body of the work vehicle.

16. The front loader frame according to claim 9, wherein the third attachment portion is directly fixable via mounting openings to the first attachment; and
the fourth attachment portion is directly fixable via mounting openings to the second attachment.

17. A front loader frame configured to mount a boom to a work vehicle, comprising:
a first attachment having a first attachment surface oriented on a first virtual plane and being configured to be fixable to one portion of a vehicle body of the work vehicle;

said first attachment comprising mounting openings and being arranged on a first frame member;

a second attachment having a second attachment surface oriented on a different virtual plane from the first virtual plane and being configured to be fixable to another and different portion of the vehicle body of the work vehicle;

said second attachment comprising mounting openings and being arranged on the first frame member;

said first and second attachment surfaces are spaced from one another in an up-and-down direction and in a lateral direction of the vehicle body of the work vehicle;

a third attachment portion arranged on a second frame member and being connectable to the first attachment;

said third attachment portion comprising a third attachment surface;

a fourth attachment portion arranged on a second frame member and being connectable to the second attachment;

said fourth attachment portion comprising a fourth attachment surface; and said third and fourth attachment surfaces being spaced from one another in an up-and-down direction and in a lateral direction of the vehicle body of the work vehicle.

* * * * *

UNITED STATES PATENT AND TRADEMARK OFFICE
CERTIFICATE OF CORRECTION

PATENT NO.       : 10,024,026 B2
APPLICATION NO.  : 14/809627
DATED            : July 17, 2018
INVENTOR(S)      : Aikiyoshi Uchijima et al.

It is certified that error appears in the above-identified patent and that said Letters Patent is hereby corrected as shown below:

On the Title Page

Item (57), Abstract, Line 3, please change "portion a" to --portion of a--.

In the Claims

Column 16, Line 49 (Claim 7), please change "portion a" to --portion of a--.

Column 17, Line 43 (Claim 15), please change "portion a" to --portion of a--.

Signed and Sealed this
Fifteenth Day of January, 2019

Andrei Iancu
*Director of the United States Patent and Trademark Office*